US010585607B2

(12) United States Patent
Kazi (10) Patent No.: US 10,585,607 B2
(45) Date of Patent: Mar. 10, 2020

(54) DETERMINING AN OPTIMUM SELECTION OF FUNCTIONS FOR UNITS IN A DSN MEMORY

(71) Applicant: International Business Machines Corporation, Armonk, NY (US)

(72) Inventor: Asimuddin Kazi, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 15/348,611

(22) Filed: Nov. 10, 2016

(65) Prior Publication Data

US 2018/0129438 A1    May 10, 2018

(51) Int. Cl.
*G06F 3/06* (2006.01)
*H04L 29/08* (2006.01)

(52) U.S. Cl.
CPC ............ *G06F 3/0631* (2013.01); *G06F 3/067* (2013.01); *G06F 3/0611* (2013.01); *H04L 67/1097* (2013.01)

(58) Field of Classification Search
None
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Eric Cardwell
(74) *Attorney, Agent, or Firm* — Garlick & Markison; Timothy W. Markison; Timothy D. Taylor (57) ABSTRACT

A computing device includes an interface configured to interface and communicate with a dispersed storage network (DSN), a memory that stores operational instructions, and a processing module operably coupled to the interface and memory such that the processing module, when operable within the computing device based on the operational instructions, is configured to perform various operations. The computing device determines estimated need of capabilities within the DSN based processing access requests for data, storing of the data, and/or rebuilding of the data and also determines actual capabilities within the DSN based on provisioned dispersed storage (DS) units within the DSN. The computing device then generates an assignment of functions for the DS units within the DSN and directs the DS units within the DSN to operate based on the assignment of functions.

20 Claims, 7 Drawing Sheets

(56) References Cited

U.S. PATENT DOCUMENTS

| | | |
|---|---|---|
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2014/0101221 A1* | 4/2014 | Alnafoosi ............ H04L 67/10 709/201 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

PLANK, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

DETERMINING AN OPTIMUM SELECTION OF FUNCTIONS FOR UNITS IN A DSN MEMORY

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Within data storage systems, the prior art does not provide an adequate means by which effective operation can be achieved in an efficient manner. Oftentimes, the needs within a data storage system do not match the requirements for data storage servicing, and vice versa. There continues to be a need in the art to improve the manner by which data storage systems operate for a more effective operation.

DETAILED DESCRIPTION OF THE INVENTION

Figure 1:
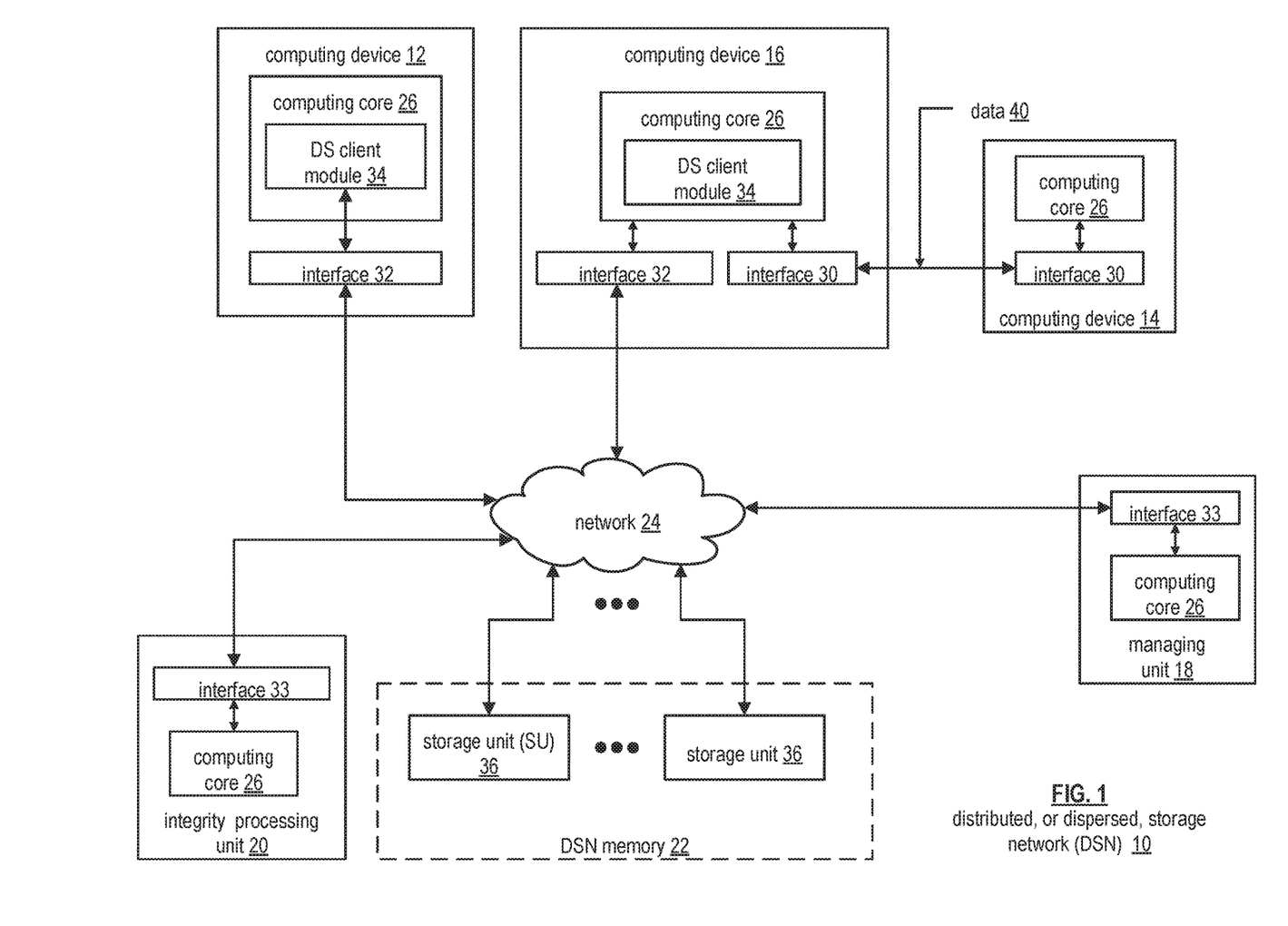
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
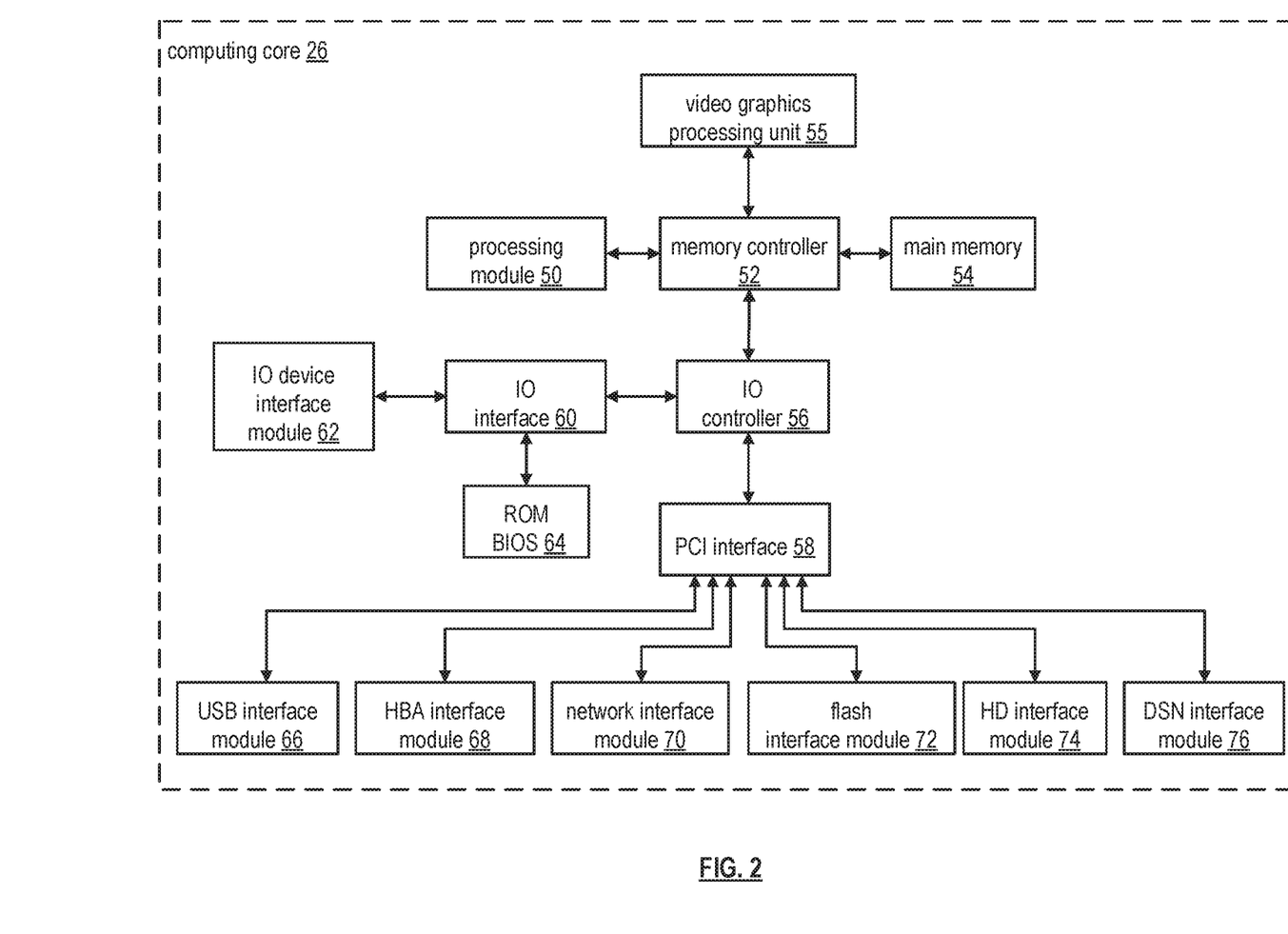
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
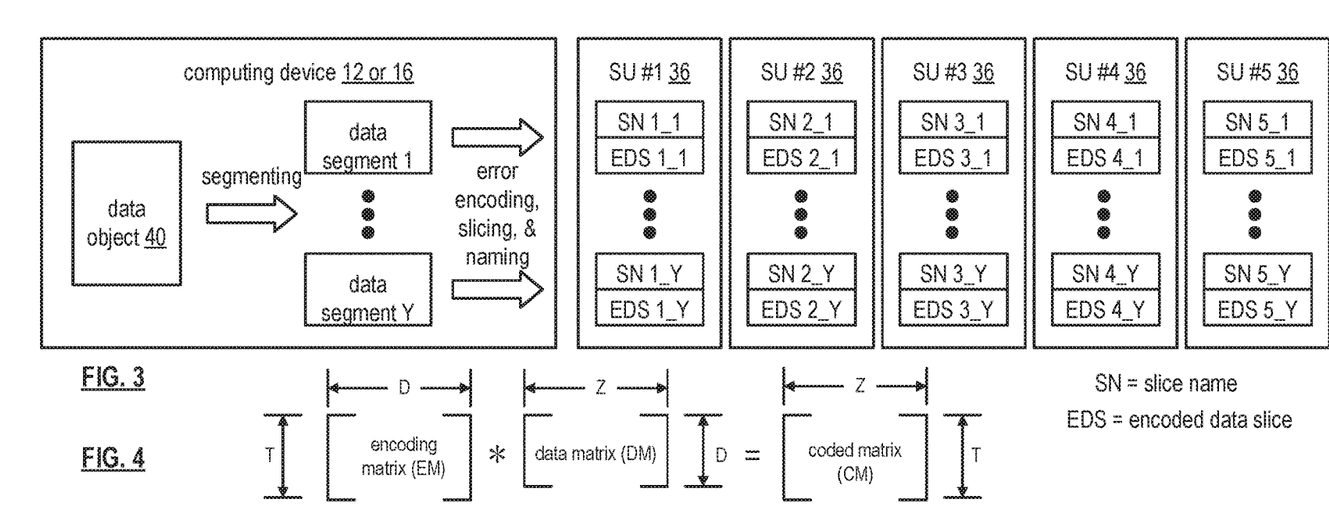
FIG. 3 is a schematic block diagram of an example of dispersed storage error encoding of data in accordance with the present invention.
FIG. 4 is a schematic block diagram of a generic example of an error encoding function in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figure 5:
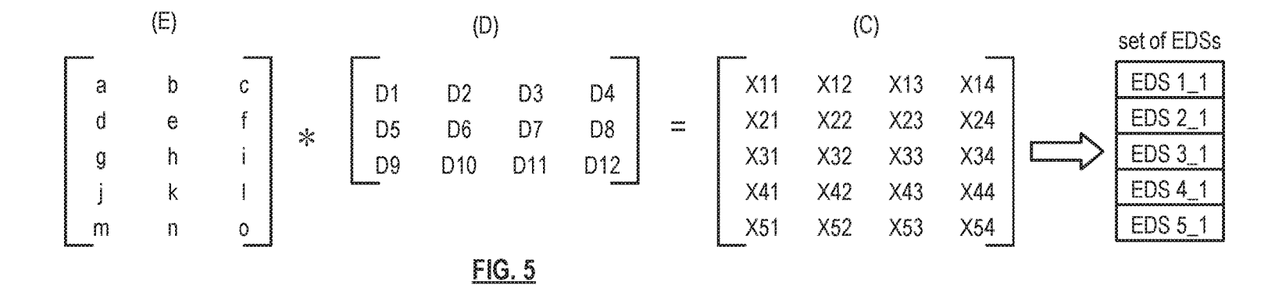
FIG. 5 is a schematic block diagram of a specific example of an error encoding function in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Figure 6:
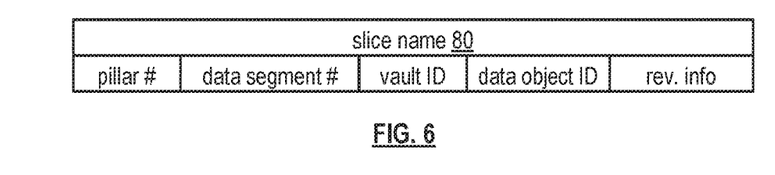
FIG. 6 is a schematic block diagram of an example of a slice name of an encoded data slice (EDS) in accordance with the present invention.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
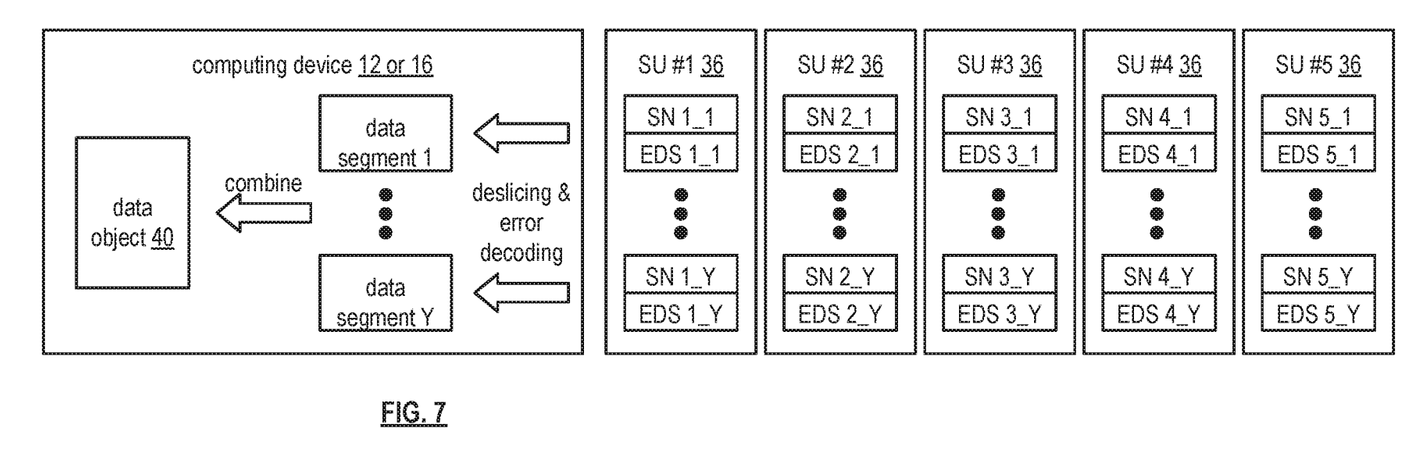
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
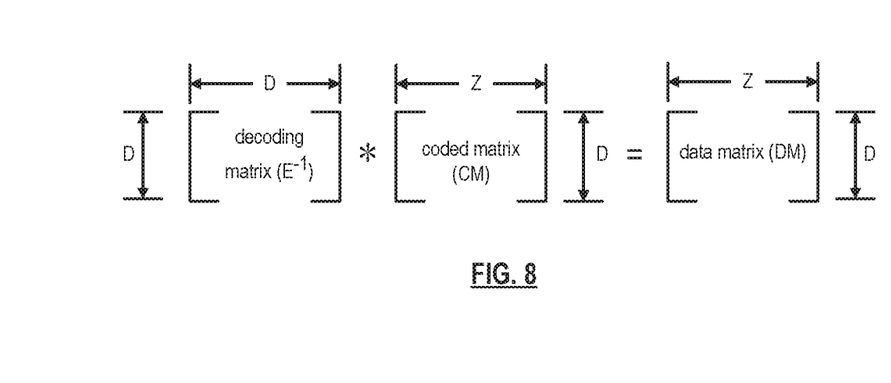
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
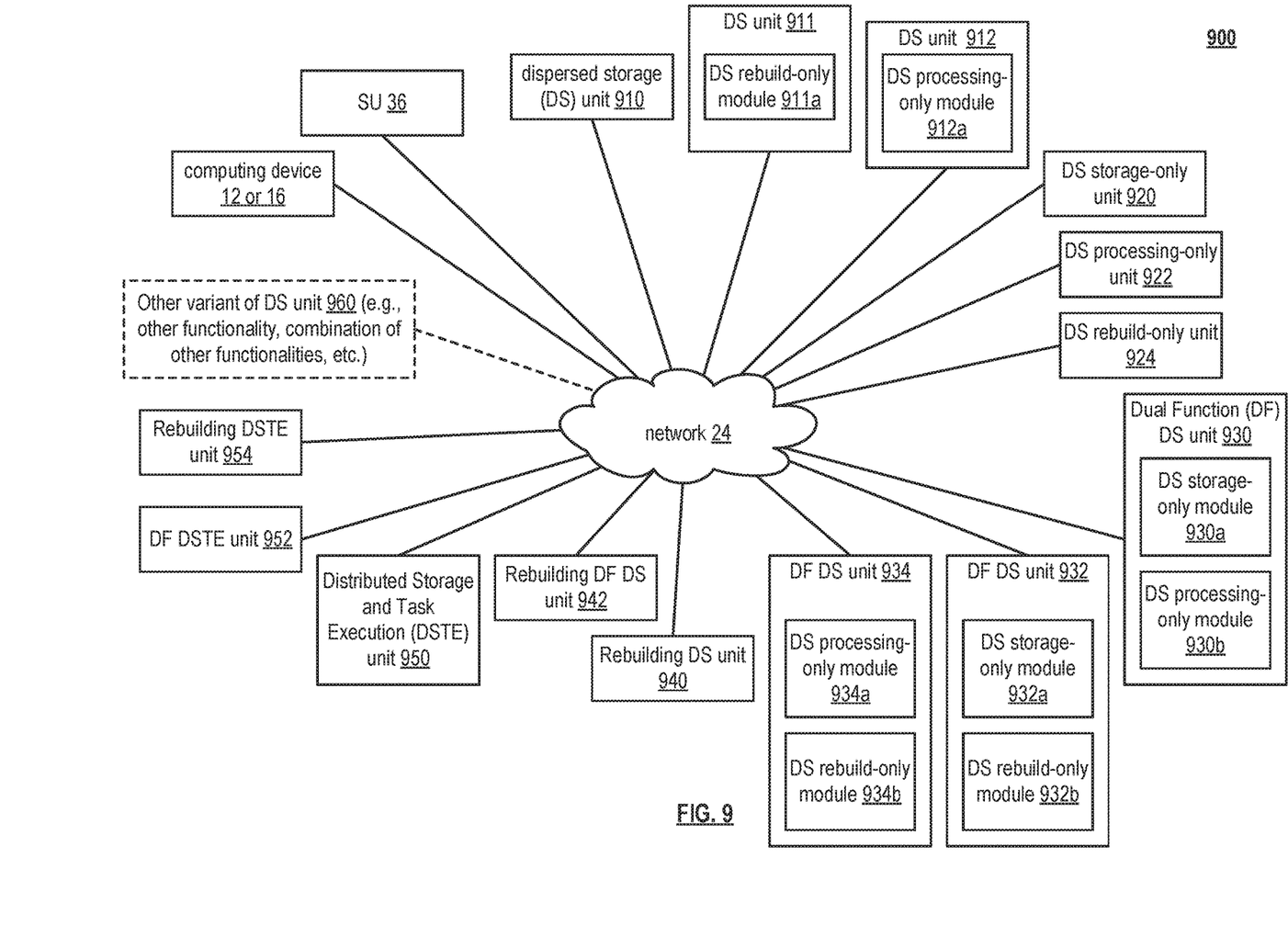
FIG. 9 is a schematic block diagram of another embodiment of a DSN in accordance with the present invention.

FIG. 9 is a schematic block diagram of another embodiment 900 of a DSN in accordance with the present invention. The DSN includes any one or more of a computing device 12 or 16, a SU 36, a dispersed storage (SU) unit 910, a DS unit 911 that includes a DS rebuild-only module 911*a*, a DS unit 912 that includes a DS processing-only module 912*a*, a DS storage-only unit 920, a DS processing-only unit 922, a DS rebuild-only unit 924, a dual function (DF) DS unit 930 that includes a DS storage-only module 930*a* and a DS processing-only module 930*b*, a DF DS unit 932 that includes a DS storage-only module 932*a* and a DS rebuild-only module 932*b*, a DF DS unit 934 that includes a DS processing-only module 934*a* and a DS rebuild-only module 934*b,a* rebuilding DS unit 940, a rebuilding DF DS unit 942, a distributed storage and task execution (DSTE) unit 950, a DF DSTE unit 952, a rebuilding DSTE unit 954, and/or any other variant of a DS unit 960. Note that a distributed storage and task execution (DSTE) unit 950 maybe implemented to perform any number of functions assigned to it. For example, a DSTE unit of a set of DSTE units may be configured to perform one or more partial tasks of a task to be performed on data such as in accordance with encoding and/or decoding operations as described herein.

Note also that a tri-function DS unit may alternatively or also be implemented that includes a DS processing-only module, a DS storage-only module, and a DS rebuild-only module. In general, a DS unit may include any combination of DS only-type modules to perform various functions. Alternatively a DS module may be implemented to perform two or more of the various functions. In general, any other variant of a DS unit 960 may be implemented to perform any one or more of the various functions to be performed in accordance with various operations as described herein including data access requests (e.g., read and/or write), rebuilding of data based on a dispersed error encoding (DSE) scheme such as described herein, etc.

Note that the various types of DS units may include any of various types of DS as described above and/or may include functionality, circuitry, capability, etc. to perform operations of any one or more of a DS storage-only unit, a DS processing-only unit, a DS rebuild-only unit, a DS unit that includes a rebuild-only module, a dual-function (DF) DS unit that includes DS storage-only unit functionality and DS processing-only unit functionality, a rebuilding DS unit, a rebuilding DF DS unit, a distributed storage and task execution (DSTE) unit, a DF DSTE unit, and/or a rebuilding DSTE unit.

In an example of operation and implementation, a computing device 12 or 16 includes an interface configured to interface and communicate with a dispersed storage network (DSN), a memory that stores operational instructions, and a processing module operably coupled to the interface and memory such that the processing module, when operable within the computing device 12 or 16 based on the operational instructions, is configured to perform various operations.

In a particular example of operation and implementation, a computing device 12 or 16 is configured to determine estimated need of capabilities within the DSN based on at least one of processing access requests for data, storing of the data, or rebuilding of the data, determine actual capabilities within the DSN based on provisioned dispersed storage (DS) units within the DSN, generate an assignment of functions for the DS units within the DSN that specifies the at least one of the processing access requests for data, the storing of the data, or the rebuilding of the data among the DS units based on the estimated need of capabilities within the DSN and the actual capabilities within the DSN, and direct the DS units within the DSN to operate based on the assignment of functions.

Note than any one of the devices in the DSN may be implemented and/or configured to perform such operations to result in the directing of the DS units within the DSN to operate based on the assignment of functions.

In some examples, the computing device 12 or 16 is also configured to determine updated estimated need of capabilities within the DSN based on at least one of updated processing access requests for data, updated storing of the data, or updated rebuilding of the data after determination of the estimated need of the capabilities within the DSN based on at least one of the processing access requests for data, the storing of the data, or the rebuilding of the data. The computing device 12 or 16 is then configured to determine updated actual capabilities within the DSN based on the provisioned DS units or updated provisioned DS units within the DSN. The computing device 12 or 16 is then configured to generate an updated assignment of functions for the DS units or the updated provisioned DS units within the DSN that specifies the at least one of the updated processing access requests for data, the updated storing of the data, or the updated rebuilding of the data among the DS units or the updated provisioned DS units within the DSN based on the updated estimated need of capabilities within the DSN and the updated actual capabilities within the DSN. Then, the computing device 12 or 16 is configured to direct the DS units or the updated provisioned DS units within the DSN to operate based on the updated assignment of functions.

In certain examples, the assignment of functions for the DS units within the DSN specifies one or more of the processing access requests for data to a DS processing-only unit to service at least one of a read request or a write request for at least a first portion of the data, the storing of the data including storing at least a second portion of the data to a DS storage-only unit, and/or the rebuilding of the data including rebuilding of at least a third portion of the data to at least one of a DS rebuild-only unit, a rebuilding DS unit, or a rebuilding DF dual-function (DF) DS unit that includes DS storage-only unit functionality and DS processing-only unit functionality.

In general, an assignment of functions assigns one or more respective functions to one or more DS units within the DSN so as to provide an optimal allocation of such functions among the DS units within the DSN in an optimal manner so as to provide for effective operation of the DSN (e.g., first one or more functions assigned to a first DS unit, second one or more functions assigned to a second DS unit, etc.).

In some examples, note that the data includes a data object. The data object is segmented into data segments, wherein a data segment of data segments is dispersed error encoded in accordance with dispersed error encoding parameters to produce a set of encoded data slices (EDSs) that is of pillar width. The set of EDSs are distributedly stored among at least some of the DS units. A decode threshold number of EDSs are needed to recover the data segment, a read threshold number of EDSs provides for reconstruction of the data segment, and a write threshold number of EDSs provides for a successful transfer of the set of EDSs from a first at least one location in the DSN to a second at least one location in the DSN.

Note that the computing device 12 or 16 may be located at a first premises that is remotely located from at least one SU and/or DS of the primary SUs or plurality of secondary SUs the within the DSN. Also, note that the computing device 12 or 16 may be of any of a variety of types of devices as described herein and/or their equivalents including a SU and/or DS of any group or set of SUs and/or DSs within the DSN, a wireless smart phone, a laptop, a tablet, a personal computers (PC), a work station, and/or a video game device. Note also that the DSN may be implemented to include or be based on any of a number of different types of communication systems including a wireless communication system, a wire lined communication systems, a non-public intranet system, a public internet system, a local area network (LAN), and/or a wide area network (WAN).

In an example of operation and implementation, a computing device 12 or 16 is configured to determine first estimated need of capabilities within the DSN based on first processing access requests for data, first storing of the data, and/or first rebuilding of the data. Then, the computing device 12 or 16 determine first actual capabilities within the DSN based on first provisioned dispersed storage (DS) units within the DSN and generate a first assignment of functions for the DS units within the DSN that specifies the first processing access requests for data, the first storing of the data, and/or the first rebuilding of the data among the DS units based on the estimated need of capabilities within the DSN and the actual capabilities within the DSN. The computing device 12 or 16 is then configured to direct the DS units within the DSN to operate based on the first assignment of functions.

The computing device 12 or 16 is then configured to determine, based on elapse of a period of time after determination of the first estimated need of capabilities within the DSN, second estimated need of capabilities within the DSN based on second processing access requests for data, second storing of the data, and/or second rebuilding of the data. The computing device 12 or 16 is then configured to determine second actual capabilities within the DSN based on second provisioned DS units within the DSN. In some examples, note that the second provisioned DS units within the DSN are based on addition, removal, and/or capability change of at least one DS unit within the first provisioned DS units within the DSN. The computing device 12 or 16 is then configured to generate an second assignment of functions for the second provisioned DS units within the DSN that specifies the second processing access requests for data, the second storing of the data, and/or the second rebuilding of the data among the second provisioned DS units within the DSN based on the second estimated need of capabilities within the DSN and the second actual capabilities within the DSN. The computing device 12 or 16 is then configured to direct the second provisioned DS units within the DSN to operate based on the second assignment of functions.

Figure 10A:
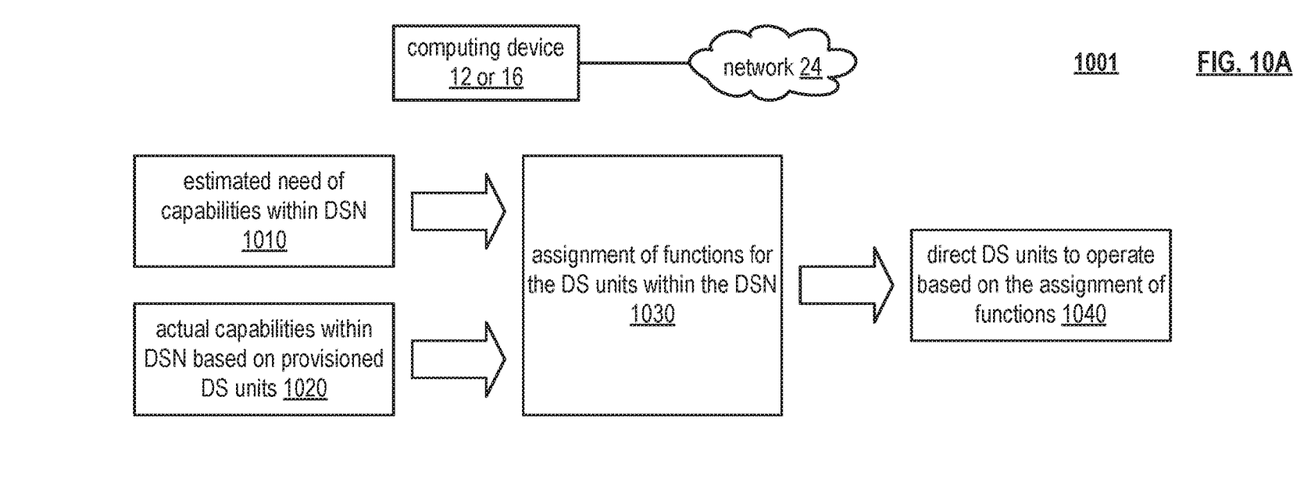
FIG. 10A is a schematic block diagram of an example of functionality and operation processing of a computing device within a DSN in accordance with the present invention.

FIG. 10A is a schematic block diagram of an example 1001 of functionality and operation processing of a computing device within a DSN in accordance with the present invention. The computing device 12 or 16 operates is configured to interface and interact with the network 24 (and/or any of a number of other devices in communication with the network 24 such as but not limited to those described with reference to FIG. 9). The computing device 12 or 16 operates to determine estimated need of capabilities within the DSN based on processing access requests for data, storing of the data, and/or rebuilding of the data in block 1010. The computing device 12 or 16 operates to determine actual capabilities within the DSN based on provisioned dispersed storage (DS) units within the DSN in block 1020. Based on these determinations in blocks 1010 and 1020, the computing device 12 or 16 operates to generate an assignment of functions for the DS units within the DSN that specifies the processing access requests for data, the storing of the data, and/or the rebuilding of the data among the DS units based on the estimated need of capabilities within the DSN and the actual capabilities within the DSN in block 1030. Then, the computing device 12 or 16 operates to direct the DS units within the DSN to operate based on the assignment of functions in block 1040. This diagram generally shows an example embodiment of the operational flow of such operations that may be performed by the computing device 12 or 16 to effectuate an optimal assignment of functions based on the need and capability of the DS units of a DSN (and/or any subset of DS units within any one or more subsets of the DSN).

Figure 10B:
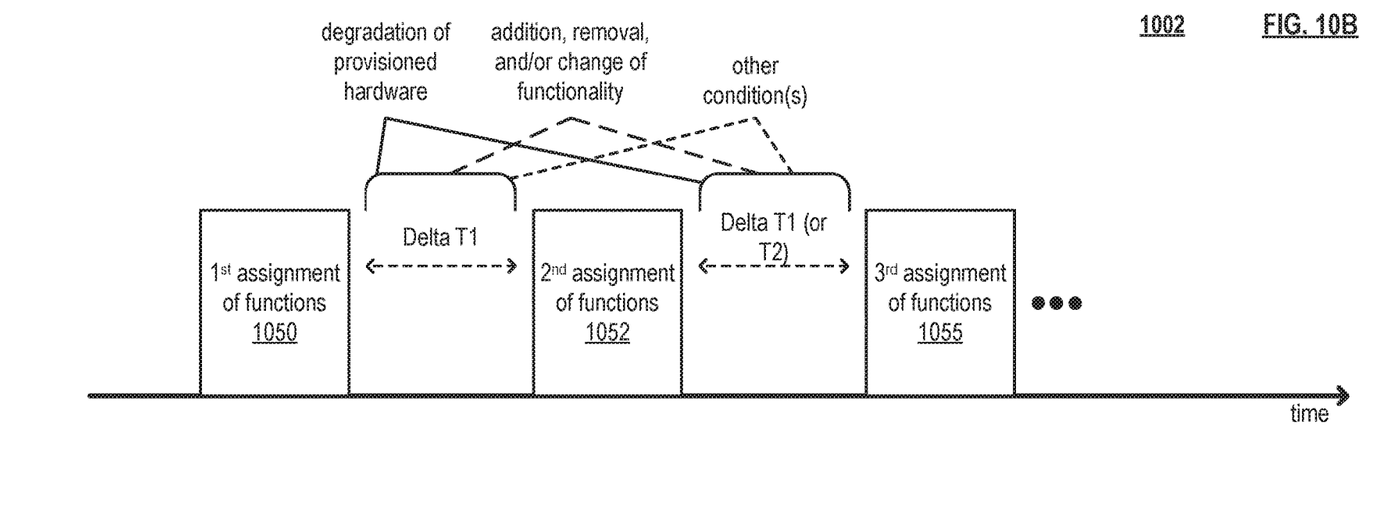
FIG. 10B is a schematic block diagram of an example of timing diagram showing operation based on different respective assignments of functions in accordance with the present invention.

FIG. 10B is a schematic block diagram of an example 1002 of timing diagram showing operation based on different respective assignments of functions in accordance with the present invention. A computing device directs DS units within a DSN to operate based on a first assignment of functions during a first time period as shown in block 1050. Then, after a period of time (e.g., a delta T1, which may be any value of a period of time greater than or equal to 0.00 seconds), the computing device directs the DS units within the DSN to operate based on a second assignment of functions during a second time period as shown in block 1052. Then, after a period of time (e.g., a delta T2 or the delta T1, which may be any value of a period of time greater than or equal to 0.00 seconds), the computing device directs the DS units within the DSN to operate based on a third assignment of functions during a third time period as shown in block 1055.

Note that the adaptation, changing, and/or generating of different respective assignments of functions for use at or during different respective times may be based on any numbers of considerations. In one example, a consideration is the elapse of a particular amount of time. In another example, a consideration is degradation of provisioned hardware within a DSN (e.g., as a DS unit may operate relatively more slowly over time as the hardware degrades over time). In another example, a consideration is the additional, removal, and/or change of functionality of a DS unit. For example, one or more DS units may be inserted and/or removed from the DSN at different respective times during operation of the DSN. In another example, the capability of a DS unit may be changed (e.g., memory, RAM, etc. added and/or removed, etc.) at a given time. In general, another other condition(s) may be used as the basis or bases by which adaptation, changing, and/or generating of different respective assignments of functions are made for use at or during different respective times of the DS units in the DSN.

Figure 11A:
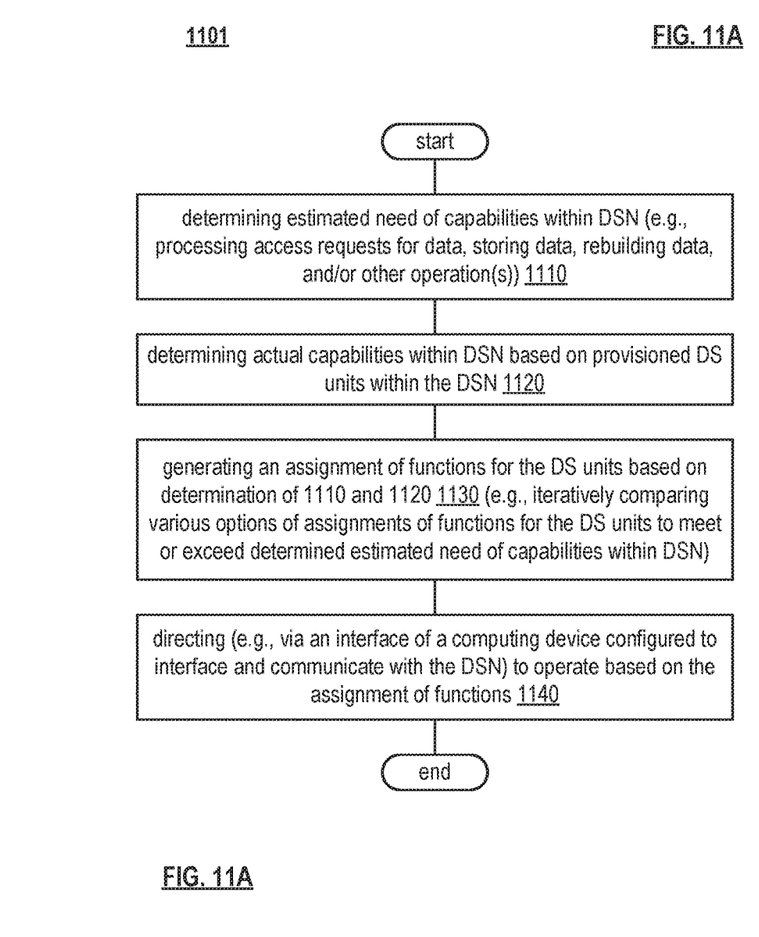
FIG. 11A is a diagram illustrating an embodiment of a method for execution by one or more computing devices in accordance with the present invention.

FIG. 11A is a diagram illustrating an embodiment of a method 1101 for execution by one or more computing devices in accordance with the present invention. The method 1101 begins in step 1110 by determining estimated need of capabilities within a dispersed storage network (DSN) based on processing access requests for data, storing of the data, and/or or rebuilding of the data. The method 1101 continues in step 1120 by determining actual capabilities within the DSN based on provisioned dispersed storage (DS) units within the DSN. The method 1101 then operates in step 1130 by generating an assignment of functions for the DS units within the DSN that specifies the processing access requests for data, the storing of the data, and/or the rebuilding of the data among the DS units based on the estimated need of capabilities within the DSN and the actual capabilities within the DSN. In some examples, the operations of the step 1130 includes generating the assignment of functions for the DS units based on determinations made in steps 1120 and 1120.

Note also that such generating the assignment of functions for the DS units may be perform iteratively by comparing various options of assignments of functions for the DS units to meet or exceed the determined estimated need of capabilities within DSN. For example, various options for assignments of functions for the DS units to may be generated and compared, and an assignment of functions for the DS units that best meets the determined estimated need of capabilities within DSN may be selected as the assignment of functions by which operation of the DS units in the DSN are directed to operate in subsequent step 1140. The method 1101 continues in step 1140 by directing (e.g., via an interface of the computing device configured to interface and communicate with the DSN) the DS units within the DSN to operate based on the assignment of functions.

Figure 11B:
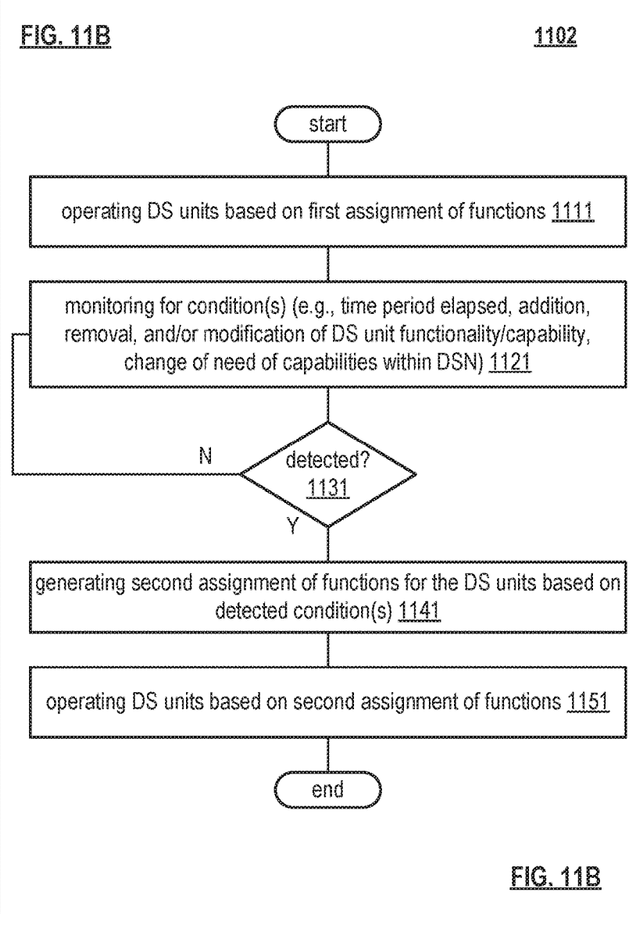
FIG. 11B is a diagram illustrating another embodiment of a method for execution by one or more computing devices in accordance with the present invention.

FIG. 11B is a diagram illustrating another embodiment of a method 1102 for execution by one or more computing devices in accordance with the present invention. The method 1102 begins in step 1111 by operating DS units within a DSN based on a first assignment of functions. The method 1102 continues in step 1121 by monitoring one or more conditions of the DSN. Examples of such conditions may include any one or more of time period elapsed, addition, removal, and/or modification of DS unit functionality/capability, change of need of capabilities within DSN, and/or any other condition(s). The method 1102 continues in decision step 1131 by determining whether one or more of the conditions is detected. When the one or more of the conditions is not detected, the method 1102 then operates by looping back to step 1121 to continue monitoring one or more conditions of the DSN. Alternatively, when the one or more of the conditions is detected, the method 1102 then continues in step 1141 by generating a second assignment of functions for the DS units based on the detected one or more condition(s). The method 1102 then continues in step 1151 by operating DS units within a DSN based on the second assignment of functions.

In some examples, note that a DF DS unit includes a DS unit that contains both a DS unit and a DS processing unit. Owing to the multiple functions and additional processing dual units are expected to handle, dual-function DS units (e.g., DF DS units) ought to be provisioned with additional computational resources, (e.g., more powerful or a larger number of CPUs, additional memory, improved networking capacity, etc.). A process for provisioning a DSN memory determines for a given set of units which ones should be directed to operate as solely DS units, solely DS processing units, solely rebuild DS modules, a DF DS unit (e.g., a DS unit and DS processing unit included therein), a rebuilding DS unit, a rebuilding DF DS unit, a DSTE unit, a DF DSTE unit, a rebuilding DF DSTE unit, and/or any other combination of operation, function, processes, etc.

The provisioning process evaluates an estimated need for processing requests, storing data, rebuilding data, and performing task execution within the DSN, and compares those needs of the DSN to the set of provisioned hardware (e.g., those DS units within the DSN and their respective capabilities). For example, this can include consideration of which of those DS units have excessive or additional processing power, which of those DS units have a lot of memory devices, which of those DS units have superior networking resources, etc. Then, the provisioning process determines an optimal assignment of functions based on the need and capability of the DS units. For example, a DS unit that includes many memory devices but also includes a lack of processing power might be deployed solely as a DS unit. In an example, a DS unit with both storage and CPU resources might be a DSTE unit. In another example, a DS unit with storage, CPU and networking could be a DF unit, or a rebuilding ds unit. In even another example, a unit with a lot of CPU and networking resources but little in terms of memory devices could be configured as a DS processing unit and/or a DS rebuild module.

Note that a DSN may include any number of different types of devices include but not limited to those described with reference to FIG. 9. An assignment of functions assigns specific tasks of traits/characteristics of the devices (e.g., DS units of various types) based on what is needed to the system, etc. For example, if a DSTE unit gets older and its performance degrades (e.g., processes operations more slowly), then that DS unit may be assigned to perform functions of only a rebuild and storage capable SU subsequently (e.g., no processing operations anymore, but only perform storage related functions). Alternatively, if a DSTE degrades to an even lower level, then perhaps the DSTE is assigned to operate only as a DS unit such as a SU that performs functions of only a storage capable SU subsequently. Alternatively, if a DS unit is brand new and includes a significant amount of hardware and/or horsepower, memory, processing capability, etc., then that DS unit may be assigned to perform other tasks for the DSN.

Note also that such assignment of functions may be implemented based on periodic updating. For example, as a DS unit gets older, that DS units assigned functions and/or responsibilities may be scales back (e.g., if bring in a new resource such as a new DS unit is brought into the system, then the operations include to determine what is needed in the system and best way to implement that, this could be made based on snapshots in time of the needs of the DSN, this could be performed periodically as a function of time, and/or based on any update/change to hardware and/or software of the system, etc.).

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
an interface configured to interface and communicate with a dispersed storage network (DSN);
memory that stores operational instructions; and
a processing module operably coupled to the interface and to the memory, wherein the processing module, when operable within the computing device based on the operational instructions, is configured to:
determine estimated need of capabilities within the DSN for of processing access requests for data in the DSN, storing of the data in the DSN, and rebuilding of the data in the DSN, wherein the DSN includes a plurality of dispersed storage (DS) units, wherein a unit of the plurality of DS units is provisioned as one or more of a storage DS unit, a processing DS unit, and a rebuilding DS unit, wherein the provisioning is based on available resources associated with the unit, and wherein the resources include one or more of processing resources, storage resources, and networking resources;
determine actual capabilities within the DSN based on provisioned DS units within the DSN;
generate an assignment of functions for the provisioned DS units within the DSN that specifies assigning the processing access requests for data, the storing of the data, and the rebuilding of the data among the provisioned DS units based on the estimated need of capabilities within the DSN and the actual capabilities within the DSN, wherein the assignment of functions includes assigning processing a first access request of the access requests regarding a first portion of the data to a first processing DS unit of the provisioned DS units, assigning storing a second portion of the data to a first storage DS unit of the provisioned DS units, and assigning rebuilding of a third portion of the data to a first rebuilding DS unit of the provisioned DS units; and
direct the provisioned DS units within the DSN to operate based on the assignment of functions.

2. The computing device of claim 1, wherein the processing module, when operable within the computing device based on the operational instructions, is further configured to:
determine updated estimated need of capabilities within the DSN for at least one of updated processing access requests for the data, updated storing of the data, or updated rebuilding of the data after determination of the estimated need of the capabilities within the DSN;
determine updated actual capabilities within the DSN based on the provisioned DS units or updated provisioned DS units within the DSN;
generate an updated assignment of functions for the provisioned DS units or the updated provisioned DS units within the DSN that specifies assigning the at least one of the updated processing access requests for data, the updated storing of the data, or the updated rebuilding of the data among the provisioned DS units or the updated provisioned DS units within the DSN based on the updated estimated need of capabilities within the DSN and the updated actual capabilities within the DSN; and
direct the provisioned DS units or the updated provisioned DS units within the DSN to operate based on the updated assignment of functions.

3. The computing device of claim 1, wherein the plurality of the DS units includes two or more of:
a DS storage-only unit;
a DS processing-only unit;
a DS rebuild-only unit;
a DS unit that includes a rebuild-only module;
a dual-function (DF) DS unit that includes DS storage-only unit functionality and DS processing-only unit functionality;
a rebuilding DS unit;
a rebuilding DF DS unit;
a distributed storage and task execution (DSTE) unit;
a DF DSTE unit; and
a rebuilding DSTE unit.

4. The computing device of claim 1, wherein the assignment of functions for the provisioned DS units within the DSN specifies:
the first processing DS unit is one of a DS unit and a DS processing only unit;
the first storage DS unit is one of a DS storage-only unit, a dual function (DF) DS unit that includes DS storage-only functionality and a storage unit; and
the first rebuilding DS unit is one of a DS unit that includes DS rebuild-only functionality, a DS rebuild-only unit, a rebuilding DS unit, a rebuilding DS unit that includes DS storage-only unit functionality and DS processing-only unit functionality, and a DF DS unit that includes DS rebuild-only functionality.

5. The computing device of claim 1, wherein the data includes a data object, wherein the data object is segmented into a plurality of data segments, wherein a data segment of the plurality of data segments is dispersed error encoded in accordance with dispersed error encoding parameters to produce a set of encoded data slices (EDSs) that is of pillar width, wherein the set of EDSs are distributedly stored among at least some of the plurality of DS units, wherein a decode threshold number of EDSs are needed to recover the data segment, wherein a read threshold number of EDSs provides for reconstruction of the data segment, and wherein a write threshold number of EDSs provides for a successful transfer of the set of EDSs from a first at least one location in the DSN to a second at least one location in the DSN.

6. The computing device of claim 1, wherein the computing device is located at a first premises that is remotely located from at least one other DS unit of the plurality of DS units within the DSN.

7. The computing device of claim 1, wherein the computing device is one or more of:
one of the plurality of DS units within the DSN, a wireless smart phone, a laptop, a tablet, a personal computers (PC), a work station, and a video game device.

8. The computing device of claim 1, wherein the DSN includes at least one of a wireless communication system, a wire lined communication systems, a non-public intranet system, a public internet system, a local area network (LAN), or a wide area network (WAN).

9. A computing device comprising:
an interface configured to interface and communicate with a dispersed storage network (DSN);
memory that stores operational instructions; and a processing module operably coupled to the interface and to the memory, wherein the processing module, when operable within the computing device based on the operational instructions, is configured to:

determine first estimated need of capabilities within the DSN for first processing access requests for data in the DSN, first storing of the data in the DSN, and first rebuilding of the data in the DSN, wherein the DSN includes a plurality of dispersed storage (DS) units, wherein a unit of the plurality of DS units is provisioned as one or more of a storage DS unit, a processing DS unit, and a rebuilding DS unit, wherein the provisioning is based on available resources associated with the unit, and wherein the resources include one or more of processing resources, storage resources, and networking resources;

determine first actual capabilities within the DSN based on first provisioned dispersed storage (DS) units within the DSN;

generate a first assignment of functions for the first provisioned DS units within the DSN that specifies assigning the first processing access requests for data, the first storing of the data, or the first rebuilding of the data among the first provisioned DS units based on the first estimated need of capabilities within the DSN and the first actual capabilities within the DSN;

direct the first provisioned DS units within the DSN to operate based on the first assignment of functions;

determine, based on elapse of a period of time after determination of the first estimated need of capabilities within the DSN, second estimated need of capabilities within the DSN based on at least one of second processing access requests for the data, second storing of the data, or second rebuilding of the data;

determine second actual capabilities within the DSN based on second provisioned DS units within the DSN, wherein the second provisioned DS units within the DSN are based on at least one of addition, removal, or capability change of at least one DS unit within the first provisioned DS units within the DSN;

generate an second assignment of functions for the second provisioned DS units within the DSN that specifies the at least one of the second processing access requests for the data, the second storing of the data, or the second rebuilding of the data among the second provisioned DS units within the DSN based on the second estimated need of capabilities within the DSN and the second actual capabilities within the DSN; and direct the second provisioned DS units within the DSN to operate based on the second assignment of functions.

10. The computing device of claim 9, wherein the plurality of DS units includes two or more of:
a DS storage-only unit;
a DS processing-only unit;
a DS rebuild-only unit;
a DS unit that includes a rebuild-only module;
a dual-function (DF) DS unit that includes DS storage-only unit functionality and DS processing-only unit functionality;
a rebuilding DS unit;
a rebuilding DF DS unit;
a distributed storage and task execution (DSTE) unit;
a DF DSTE unit; and
a rebuilding DSTE unit.

11. The computing device of claim 9, wherein the data includes a data object, wherein the data object is segmented into a plurality of data segments, wherein a data segment of the plurality of data segments is dispersed error encoded in accordance with dispersed error encoding parameters to produce a set of encoded data slices (EDSs) that is of pillar width, wherein the set of EDSs are distributedly stored among at least some of the plurality of DS units, wherein a decode threshold number of EDSs are needed to recover the data segment, wherein a read threshold number of EDSs provides for reconstruction of the data segment, and wherein a write threshold number of EDSs provides for a successful transfer of the set of EDSs from a first at least one location in the DSN to a second at least one location in the DSN.

12. The computing device of claim 9, wherein the first assignment of functions for the first provisioned DS units within the DSN specifies:
the first processing access requests for data to a DS processing-only unit to service at least one of a read request or a write request for at least a first portion of the data;
the first storing of the data including storing at least a second portion of the data to a DS storage-only unit; and
the first rebuilding of the data including rebuilding of at least a third portion of the data to at least one of a DS rebuild-only unit, a rebuilding DS unit, or a rebuilding DF dual-function (DF) DS unit that includes DS storage-only unit functionality and DS processing-only unit functionality.

13. The computing device of claim 9, wherein the DSN includes at least one of a wireless communication system, a wire lined communication systems, a non-public intranet system, a public internet system, a local area network (LAN), or a wide area network (WAN).

14. A method for execution by a computing device, the method comprising:
determining estimated need of capabilities within a dispersed storage network (DSN) for processing access requests for data in the DSN, storing of the data in the DSN, and rebuilding of the data in the DSN, wherein the DSN includes a plurality of dispersed storage (DS) units, wherein a unit of the plurality of DS units is provisioned as one or more of a storage DS unit, a processing DS unit, and a rebuilding DS unit, wherein the provisioning is based on available resources associated with the unit, and wherein the resources include one or more of processing resources, storage resources, and networking resources;
determining actual capabilities within the DSN based on the provisioned DS units within the DSN;
generating an assignment of functions for the provisioned DS units within the DSN that specifies assigning the processing access requests for data, the storing of the data, or the rebuilding of the data among the provisioned DS units based on the estimated need of capabilities within the DSN and the actual capabilities within the DSN, wherein the assignment of functions includes assigning processing a first access request of the access requests regarding a first portion of the data to a first processing DS unit of the provisioned DS units, assigning storing a second portion of the data to a first storage DS unit of the provisioned DS units, and assigning rebuilding of a third portion of the data to a first rebuilding DS unit of the provisioned DS units; and directing, via an interface of the computing device configured to interface and communicate with the DSN, the provisioned DS units within the DSN to operate based on the assignment of functions.

15. The method of claim 14 further comprising:

determining updated estimated need of capabilities within the DSN for at least one of updated processing access requests for the data, updated storing of the data, or updated rebuilding of the data after determination of the estimated need of the capabilities within the DSN;

determining updated actual capabilities within the DSN based on the provisioned DS units or updated provisioned DS units within the DSN;

generating an updated assignment of functions for the provisioned DS units or the updated provisioned DS units within the DSN that specifies assigning the at least one of the updated processing access requests for data, the updated storing of the data, or the updated rebuilding of the data among the provisioned DS units or the updated provisioned DS units within the DSN based on the updated estimated need of capabilities within the DSN and the updated actual capabilities within the DSN; and directing, via an interface of the computing device configured to interface and communicate with the DSN, the provisioned DS units or the updated provisioned DS units within the DSN to operate based on the updated assignment of functions.

16. The method of claim 14, wherein the plurality of the DS units includes two or more of:

a DS storage-only unit;
a DS processing-only unit;
a DS rebuild-only unit;
a DS unit that includes a rebuild-only module;
a dual-function (DF) DS unit that includes DS storage-only unit functionality and DS processing-only unit functionality;
a rebuilding DS unit;
a rebuilding DF DS unit;
a distributed storage and task execution (DSTE) unit;
a DF DSTE unit; and
a rebuilding DSTE unit.

17. The method of claim 14, wherein the assignment of functions for the provisioned DS units within the DSN specifies:

the first processing DS unit is one of a DS unit and a DS processing only unit;
the first storage DS unit is one of a DS storage-only unit, a dual function (DF) DS unit that includes DS storage-only functionality and a storage unit; and
the first rebuilding DS unit is one of a DS unit that includes DS rebuild-only functionality, a DS rebuild-only unit, a rebuilding DS unit, a rebuilding DS unit that includes DS storage-only unit functionality and DS processing-only unit functionality, and a DF DS unit that includes DS rebuild-only functionality.

18. The method of claim 14, wherein the data includes a data object, wherein the data object is segmented into a plurality of data segments, wherein a data segment of the plurality of data segments is dispersed error encoded in accordance with dispersed error encoding parameters to produce a set of encoded data slices (EDSs) that is of pillar width, wherein the set of EDSs are distributedly stored among at least some of the plurality of DS units, wherein a decode threshold number of EDSs are needed to recover the data segment, wherein a read threshold number of EDSs provides for reconstruction of the data segment, and wherein a write threshold number of EDSs provides for a successful transfer of the set of EDSs from a first at least one location in the DSN to a second at least one location in the DSN.

19. The method of claim 14, wherein the computing device includes one or more of one of the plurality of DS units within the DSN, a wireless smart phone, a laptop, a tablet, a personal computers (PC), a work station, or a video game device.

20. The method of claim 14, wherein the DSN includes at least one of a wireless communication system, a wire lined communication systems, a non-public intranet system, a public internet system, a local area network (LAN), or a wide area network (WAN).

* * * * *